(12) United States Patent
Zhang

(10) Patent No.: US 9,996,198 B2
(45) Date of Patent: Jun. 12, 2018

(54) CONTACT IMAGE ACQUISITION DEVICE, TOUCH SCREEN, FINGERPRINT ACQUISITION DEVICE, AND ELECTRONIC DEVICE

(71) Applicant: Vkansee Technology Company Ltd., Shenzhen, Guangdong (CN)

(72) Inventor: Mingfang Zhang, Guangdong (CN)

(73) Assignee: Vkansee Technology Company Ltd., Shenzhen (CN)

( * ) Notice: Subject to any disclaimer, the term of this patent is extended or adjusted under 35 U.S.C. 154(b) by 0 days. days.

(21) Appl. No.: 15/320,291

(22) PCT Filed: May 29, 2015

(86) PCT No.: PCT/CN2015/080200
§ 371 (c)(1),
(2) Date: Dec. 19, 2016

(87) PCT Pub. No.: WO2015/192712
PCT Pub. Date: Dec. 23, 2015

(65) Prior Publication Data
US 2017/0185234 A1    Jun. 29, 2017

(30) Foreign Application Priority Data

Jun. 20, 2014  (CN) .......................... 2014 1 0280970

(51) Int. Cl.
*G06F 3/042*  (2006.01)
*G06K 9/00*  (2006.01)

(52) U.S. Cl.
CPC ......... *G06F 3/0428* (2013.01); *G06K 9/0004* (2013.01); *G06F 2203/04109* (2013.01)

(58) Field of Classification Search
None
See application file for complete search history.

(56) References Cited

U.S. PATENT DOCUMENTS

2011/0012868 A1   1/2011  Yen et al.
2011/0050603 A1   3/2011  Park

FOREIGN PATENT DOCUMENTS

CN     101576786 A    11/2009
CN     101151186 A     6/2010
(Continued)

*Primary Examiner* — Kenneth B Lee, Jr.
(74) *Attorney, Agent, or Firm* — Bret E. Field; Bozicevic, Field & Francis LLP

(57) ABSTRACT

The present invention discloses a contact image acquisition device (11), a touch screen, a fingerprint acquisition device and an electronic device (101), wherein the contact image acquisition device includes: a light guide plate (1); a plurality of light emitters (2) configured for emitting at least a part of light beams into the light guide plate (1), wherein the plurality of light emitters (2) are disposed on at least one side of the light guide plate (1) or under the light guide plate (1); and a plurality of light receivers (3) configured for receiving the light beams emitted into the light guide plate (1) by the light emitters (2), wherein the plurality of light receivers (3) are arranged in a matrix. The touch screen, the fingerprint acquisition device and the electronic device (101) all include one or more of the contact image acquisition devices (11). The contact image acquisition device (11), the touch screen and the electronic device (101) all have a fingerprint acquisition function, and the fingerprint acquisition device, the touch screen and the electronic device (101) may be made into thin films, and they all have the advantages of low cost, low power consumption and long service life.

15 Claims, 9 Drawing Sheets

(56) References Cited

FOREIGN PATENT DOCUMENTS

| CN | 101901084 A | 12/2010 |
|----|-------------|---------|
| CN | 102193686 A | 9/2011 |
| CN | 102348574 A | 2/2012 |
| CN | 102760014 A | 10/2012 |
| CN | 103019467 A | 4/2013 |
| CN | 103699884 A | 4/2014 |
| CN | 104035620 A | 9/2014 |

Fig.9
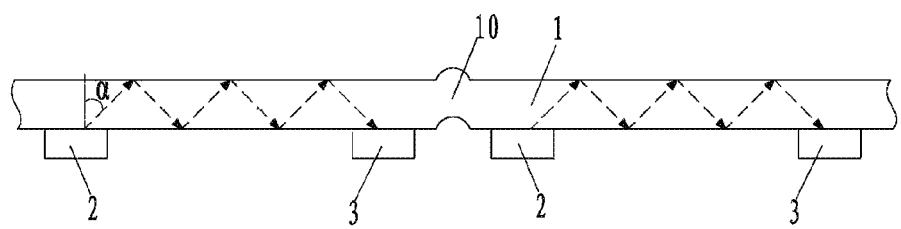
Fig.10
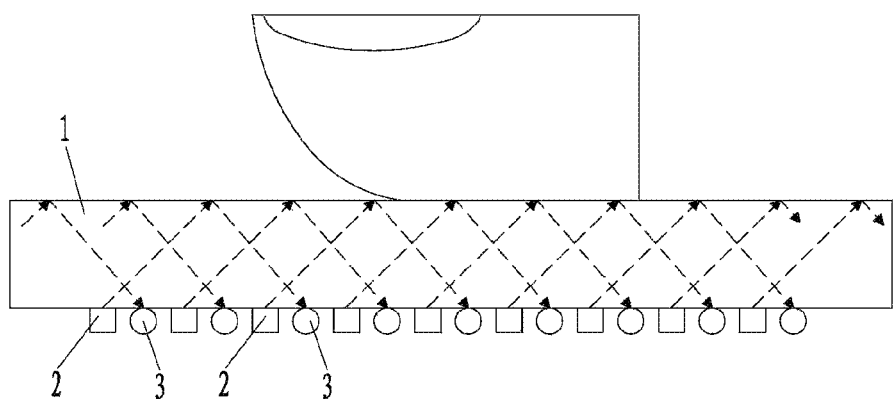
Fig.11

CONTACT IMAGE ACQUISITION DEVICE, TOUCH SCREEN, FINGERPRINT ACQUISITION DEVICE, AND ELECTRONIC DEVICE

This application claims the priorities of CN Application No. 201410280970.1 filed on Jun. 20, 2014, titled "OPTICAL SENSING KEY, TOUCH SCREEN, FINGERPRINT ACQUISITION DEVICE AND ELECTRONIC DEVICE" and International Application No. PCT/CN2014/093963 filed on Dec. 16, 2014, titled "TOUCH SENSOR, TOUCH SENSING DEVICE, FINGERPRINT IMAGE ACQUISITION DEVICE AND ELECTRONIC DEVICE", which are incorporated herein by reference in their entirety.

TECHNICAL FIELD

The present invention relates to the field of touch sensing technologies, and in particular, to a contact image acquisition device, a touch screen, a fingerprint acquisition device and an electronic device.

BACKGROUND

The total internal reflection characteristic of light is applied to optical fiber technologies, and the frustrated total internal reflection was early applied to optical fingerprint acquisition devices and touch screens. However, in the existing optical fingerprint acquisition devices, optical systems such as prisms and lenses are widely used to capture fingerprint images after the frustrated total internal reflection. For example, a thin optical fingerprint acquisition device disclosed in 201120403301.0 generally includes an image acquisition prism, an imaging apparatus and an image processing component, wherein, the imaging apparatus further includes a lens, a photoelectric signal conversion circuit, a digital processor, and other components. A relatively long light path is required to meet the requirement for imaging, because the image acquisition prism is used as an acquisition component for light, and the lens is required to complete the optical imaging of fingerprint. The image acquisition device must have a relatively large volume and thickness to complete the acquisition of a fingerprint image, due to a relatively large volume and thickness of the image acquisition prism and the lens, as well as factors such as the length of light path. Such an optical system is very difficult to be used to mobile electronic devices such as mobile phone, tablet and the like. However, in the existing touch screen technology that employs frustrated total internal reflection, a light emitter and a light receiver are either placed on a side of a light guide plate, or a camera is placed under the light guide plate to capture an image, which cannot be used for acquiring the fingerprint image. In addition, it is difficult for the existing image acquisition device to meet requirements of various electronic terminals for low cost, small volume and ultrathin thickness of the image acquisition device, due to the high cost and complex structure caused by associated components such as the image acquisition prism and the lens.

SUMMARY

The present invention provides a contact image acquisition device, a touch screen, a fingerprint acquisition device and an electronic device. The contact image acquisition device of the invention is implemented based on the principle of frustrated total internal reflection (FTIR), and may have a fingerprint image acquisition function and a touch locating function at the same time. The touch screen, the fingerprint acquisition device and the electronic device of the invention all have a fingerprint acquisition function. The contact image acquisition device, the touch screen, the fingerprint acquisition device and the electronic device may be fabricated in the form of thin films, and have low cost, low power consumption and long service life.

In order to achieve the above objects, the invention provides a contact image acquisition device, which includes:
a light guide plate;
a plurality of light emitters configured for emitting at least part of light into the light guide plate, wherein the plurality of light emitters are disposed on at least one side of the light guide plate or under the light guide plate; and
a plurality of light receivers configured for receiving the light emitted into the light guide plate by the light emitters, wherein the plurality of light receivers are arranged in a matrix.

Further, the plurality of light receivers are disposed under the light guide plate.

Further, the light receivers are tightly fitted to a lower surface of the light guide plate.

Further, each of the light receivers is disposed at an orientation and position in which light entering the light guide plate and propagating through total internal reflection can be received, or at an orientation and position in which light reflected by a surface of an object contacting the light guide plate can be received.

Further, one part of the light receivers are disposed at an orientation and position in which light entering the light guide plate and propagating through total internal reflection can be received, and the other part of the light receivers are disposed at an orientation and position in which light reflected by a surface of an object contacting the light guide plate can be received.

Further, at least part of light is emitted into the light guide plate with an angle from $\arcsin(n_0/n_2)$ to $\arcsin(n_1/n_2)$, with respect to the normal direction of the light guide plate surface; wherein, $n_0$ is a refractive index of an external medium of the light guide plate, $n_1$ is a refractive index of the surface of the object contacting the light guide plate, and $n_2$ is a refractive index of the light guide plate.

Further, the light emitted by the light emitters is visible light, or near infrared light/infrared light that is invisible to naked eyes.

Further, each of the light emitters is placed together with one light receiver in pairs.

Further, a light-blocking structure is disposed between adjacent pairs of light emitters and light receivers.

Further, the light-blocking structure is a light-blocking coating or a light-blocking groove disposed on the light guide plate, a concave or convex structure formed on the light guide plate through processing, or a coating made of a transparent material with a refractive index different from the refractive index of the light guide plate.

Further, light emitted by a light emitter in each pair is received by a light receiver in another pair disposed to be spaced apart from the each pair.

Further, the light emitters emit light continuously or in pulse mode, and the light receivers receive light continuously or in pulse mode.

A touch screen is provided, which includes one or more contact image acquisition devices according to claim 1.

Further, a plurality of contact image acquisition devices are arranged in a matrix.

A fingerprint acquisition device is provided, which includes one or more contact image acquisition devices.

Further, a plurality of contact image acquisition devices are arranged in a matrix.

An electronic device is provided, which includes one or more contact image acquisition devices.

After employing the above solution, the invention has the following advantages.

1) It has a fingerprint acquisition function and a touch screen function at the same time;

2) It does not have mechanical component, and has a long service life;

3) It has a good surface integrity, and may be easily integrated with other devices such as smart phone, tablet and the like;

4) Its surface is a transparent light guide plate that is smooth and clean, and is very easy to be maintained and cleaned;

5) A low power consumption operation may be implemented, and the wake-up of a sleeping device may be implemented;

6) It may make precise response to the touch of a finger; the response will be triggered only when a finger or an material with a refractive index approaching that of skin touches the light guide plate and frustrates the total internal reflection of light in the light guide plate, and the response will not be triggered by general clothes, metals, wood products and the like.

BRIEF DESCRIPTION OF THE DRAWINGS

FIG. 9 is a schematic diagram of a contact image acquisition device according to a ninth embodiment of the invention;

FIG. 10 is a schematic diagram of a contact image acquisition device according to a tenth embodiment of the invention;

FIG. 11 is a schematic diagram of a contact image acquisition device according to an eleventh embodiment of the invention;

DETAILED DESCRIPTION OF THE EMBODIMENTS

The invention will be further described below in conjunction with the drawings.

Figure 1:
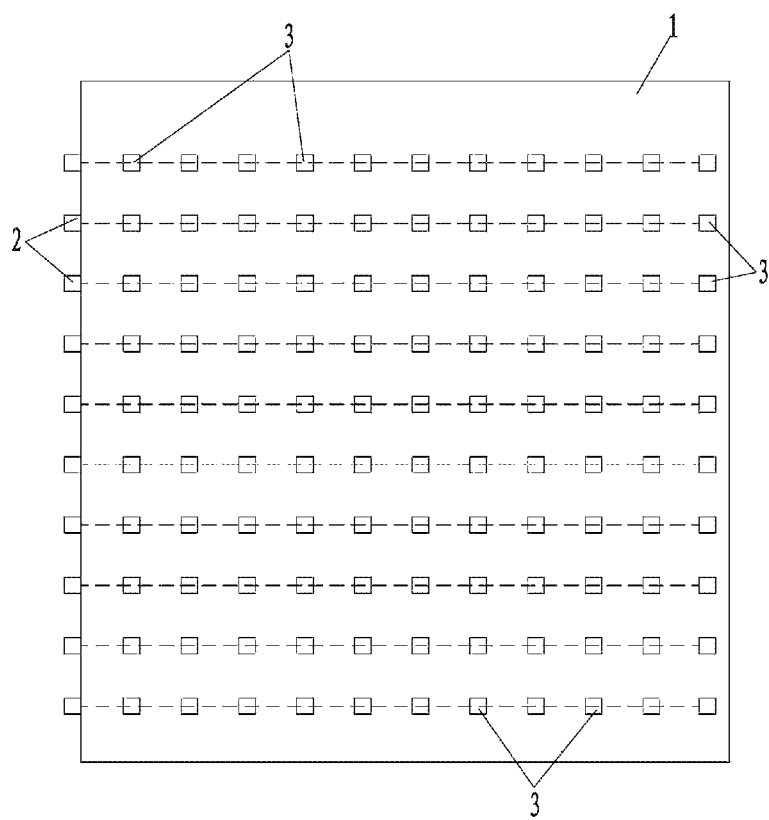
FIG. 1 is a schematic diagram of a contact image acquisition device according to a first embodiment of the invention.

As shown in FIG. 1, the schematic diagram of a contact image acquisition device according to a first embodiment of the invention. The contact image acquisition device includes a light guide plate 1, a plurality of light emitters 2 for emitting at least part of light into the light guide plate 1, and a plurality of light receivers 3 for receiving the light emitted into the light guide plate 1 by the light emitters 2. The plurality of light emitters 2 are disposed on at least one side of the light guide plate 1 or under the light guide plate 1. The plurality of light receivers 3 are arranged in a matrix.

In this embodiment, the plurality of light emitters 2 are tightly fitted to one side of the light guide plate 1, and the plurality of light receivers 3 are tightly fitted and adhered to a lower surface of the light guide plate 1.

In other embodiments, the light emitters 2 and the light receivers 3 may not be fitted to the light guide plate 1, for example, the plurality of light emitters 2 and the plurality of light receivers 3 are respectively fitted to a plurality of supports on the light guide plate 1, but they need to meet that at least part of light emitted by the light emitters 2 is emitted into the light guide plate 1, the light receivers 3 can receive the light emitted into the light guide plate 1 by the emitters 2, and light emitted into the light guide plate 1 by each light emitter 2 is received by the plurality of light receivers 3, respectively. In this figure, the plurality of light receivers 3 corresponding to each light emitter 2 are all located on the same level of dashed line.

The light guide plate 1 is made of a transparent material such as glass, resin and the like. The light guide plate 1 may be made into a rectangular plate, a circular plate or the like. In this embodiment, the light guide plate 1 is disposed as the rectangular plate.

An angle α between light emitted into the light guide plate 1 by the light emitter 2 (herein, for convenient description, it is called an incident angle for short) and the) normal direction of the light guide plate surface is $\arcsin(n_0/n_2)$ to $\arcsin(n_1/n_2)$; wherein, $n_0$ is a refractive index of an external medium (which is generally air) of the light guide plate, $n_1$ is a refractive index of a surface of an object (for example, finger) contacting the light guide plate, and $n_2$ is a refractive index of the light guide plate. When $n_0=1.0$, $n_1=1.33$ and $n_2=1.5$, the incident angle α will be between 42 degrees and 62 degrees. Preferably, α is 45 degrees here.

The above setting of the incident angle α of the light emitted into the light guide plate 1 guarantees that the light will propagate laterally through total internal reflection in the light guide plate 1 and the light receivers 3 may receive the light. In this embodiment, the structure of the light emitter 2 in FIG. 1 is very small in fact. FIG. 1 is drawn in a huge scale in order to be easy to observe its structure. Therefore, the size and the scale cannot be regarded as the actual size. The same is true for drawings with the related structures below. The protection scope of the invention will not be limited thereto.

The contact image acquisition device of this embodiment may be used for acquiring image of a finger pressed, or detecting whether the light guide plate 1 is touched by a finger, or detecting a location touched by a finger. In use, when no finger is touching the light guide plate 1, the light in the light guide plate 1 propagates through total internal reflection, and the energy of the light received by each light receiver 3 will be constant. When a finger is touching the light guide plate 1, because the refractive index of the surface of the object (finger) contacting the light guide plate 1 is higher, thus the total internal reflection condition of the light is frustrated. Therefore, incident light is projected onto the finger through the surface of the light guide plate 1. Part of incident light is absorbed by the finger, and part of incident light is diffused in various angles, so that an output signal of the light receiver 3 corresponding to a location touched by the finger becomes weak. Because the energy of the light emitted by one light emitter 2 is received by the plurality of light receivers 3, by detecting the change of output signals of the light receivers 3, a fingerprint image may be acquired, whether the light guide plate 1 is touched by a finger may be detected, or a location touched by the finger may be detected.

The light emitted by the light emitter 2 may be visible light, or near infrared light/infrared light that is invisible to naked eyes, as long as the energy of the light received by the light receiver 3 emitted from the light emitter 2 changes. In addition, because near infrared light and infrared light are light visible to naked eyes, and have little vision interference on human eyes, they may be applied to a dark transparent material, for example, a black transparent material.

The contact image acquisition device according to the invention may be used as a cold screen wake-up key or HOME key of a mobile device such as a smart phone, a tablet or the like. When the contact image acquisition device is used as the above functions, it is implemented by connecting the light emitters 2 with a power control system of the mobile device and selecting the light emitters 2 and the light receivers 3 with low power consumption; or, the light emitters 2 and the light receivers 3 work intermittently. For example, the light emitters 2 and the light receivers 3 work once at an interval of 0.1 s, and they are in a power-off state at other time. The interval length may be set. However, the size of the internal should be matched with the speed at which the finger touches and leaves the contact image acquisition device, so that the user has good experience.

In this embodiment, side lighting is performed at one side of the light guide plate 1. This may save the power consumption and reduce the cost.

Figure 2:
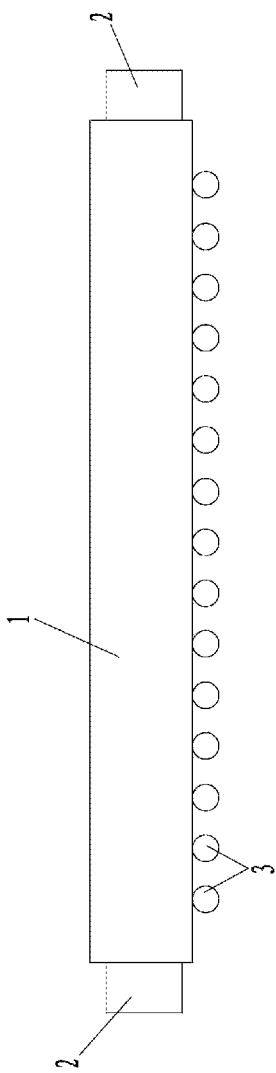
FIG. 2 is a schematic diagram of a contact image acquisition device according to a second embodiment of the invention.

For the schematic diagram of the contact image acquisition device according to a second embodiment of the invention as shown in FIG. 2, most of the structure thereof is the same as that in the embodiment in shown FIG. 1, except that the plurality of light emitters 2 are disposed at a plurality of sides of the light guide plate 1. In this embodiment, they are disposed at all four sides. Furthermore, they may be disposed at two or three sides of the light guide plate 1. By such a design, the light receivers 3 may obtain as much light as possible, so that the energy may be distributed more uniformly in the light guide plate 1, and a better fingerprint image may be obtained.

The method of using the contact image acquisition device of this embodiment is the same as that of the embodiment shown in FIG. 1, and it will not be described again here.

Figure 3:
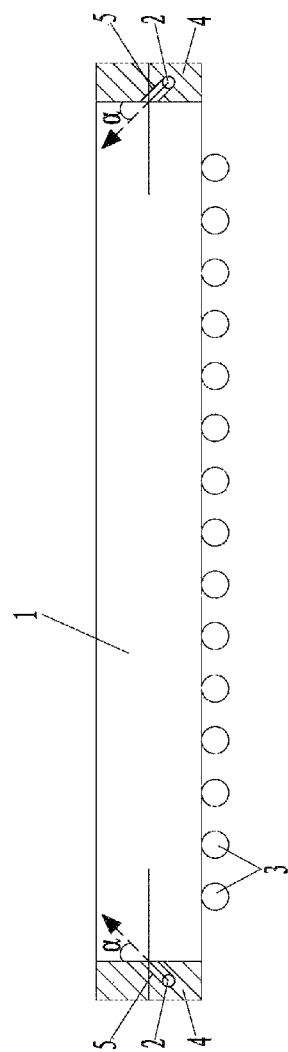
FIG. 3 is a schematic diagram of a contact image acquisition device according to a third embodiment of the invention.

For the schematic diagram of the contact image acquisition device according to a third embodiment of the invention as shown in FIG. 3, most of the structure thereof is the same as that in the embodiment shown in FIG. 2, except that the plurality of light emitters 2 are respectively disposed on a plurality of supports 4 connected to sides of the light guide plate 1, each support 4 is respectively provided with a guiding groove 5 that inclines upward, and the light emitters 2 are placed within the guiding groove 5. The inclining degree of the guiding groove 5 guarantees that an angle α between light emitted into the light guide plate 1 by the light emitter 2 (here, for convenient description below, it is called an incident angle for short) and the normal direction of the light guide plate surface is $\arcsin(n_0/n_2)$ to $\arcsin(n_n/n_2)$; where, $n_0$ is a refractive index of an external medium (which is generally the air) of the light guide plate, $n_1$ is a refractive index of a surface of an object (for example, finger) contacting the light guide plate, and $n_2$ is a refractive index of the light guide plate. When $n_0=1.0$, $n_1=1.33$ and $n_2=1.5$, the incident angle α is between 42 degrees and 62 degrees. Preferably, α is 45 degrees here.

This embodiment is only a preferred embodiment, and the function of the contact image acquisition device can be implemented so long as part of light emitted by the light emitters 2 can be emitted into the light guide plate 1. However, the protection scope of the invention cannot be limited thereto.

Figure 4:
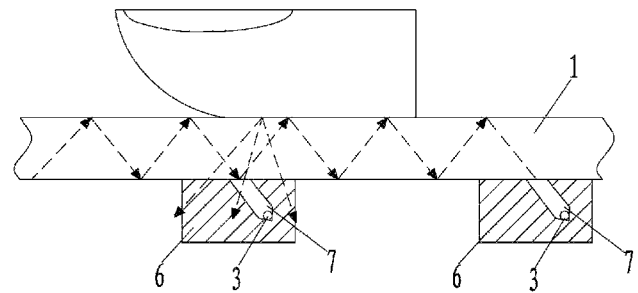
FIG. 4 is a schematic diagram of a contact image acquisition device according to a fourth embodiment of the invention.

For the schematic diagram of the contact image acquisition device according to a fourth embodiment of the invention as shown in FIG. 4, most of the structure thereof is the same as that in the embodiment shown in FIG. 2, except that the plurality of light receivers 3 are respectively disposed on a plurality of second supports 6 connected to a lower surface of the light guide plate 1, each second support 6 is respectively provided with a second light guiding groove 7 that inclines to the top left, and the plurality of light receivers 3 are respectively disposed within the second light guiding grooves 7 of the plurality of second support 6. The light receivers 3 are restricted by the second light guiding grooves 7 to receive light propagating through total internal reflection in the light guide plate 1. When a finger is touching an upper surface of light guide plate 1, because the total internal reflection of the light in the light guide plate 1 is frustrated, an output signal of each light receiver 3 will be attenuated. Therefore, by detecting the attenuation of signals of the light receivers 3, a fingerprint image may be acquired, whether the light guide plate is touched by a finger may be detected, or a location touched by a finger may be detected.

In this embodiment, the light receivers 3 are disposed in the second light guiding grooves 7 of the second supports 6. Furthermore, the second supports 6 may be removed, and each light receiver 3 is disposed at an orientation and position in which light entering the light guide plate 1 and propagating through total internal reflection can be received.

Figure 5:
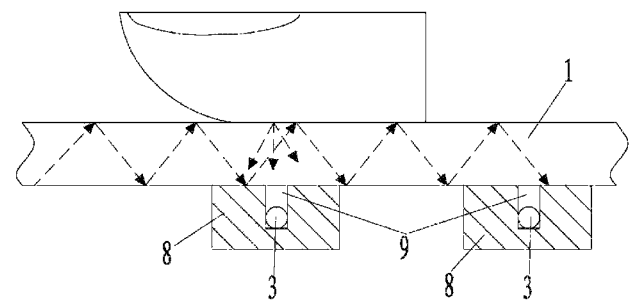
FIG. 5 is a schematic diagram of a contact image acquisition device according to a fifth embodiment of the invention.

For the schematic diagram of the contact image acquisition device according to a fifth embodiment of the invention as shown in FIG. 5, most of the structure thereof is the same as that in the embodiment shown in FIG. 4, except that the plurality of light receivers 3 are respectively disposed on a plurality of third supports 8 connected to a lower surface of the light guide plate 1, each third support 8 is respectively provided with a vertical upward third light guiding groove 9, and the plurality of light receivers 3 are respectively disposed in the third light guiding grooves 9 of the plurality of third supports 8. The light receivers 3 are restricted by the third light guiding grooves 9 to receive light diffused by the surface of the finger. In the case that there is no other external environment parasitic light except for the light propagating in the light guide plate 1, when a finger is touching the surface of the light guide plate 1, because the total internal reflection of the light in the light guide plate 1 is frustrated, part of the light is projected onto the finger surface leaking from the light guide plate 1 and is reflected by the surface of the finger. The light reflected is projected onto the light receivers 3, thereby a signal output by each light receiver 3 is enhanced. By detecting the enhancement of the signals of the light receivers 3, a fingerprint image may be acquired, whether the light guide plate 1 is touched by a finger may be detected, or a location touched by a finger may be detected.

In this embodiment, the light receivers 3 are disposed in the third light guiding grooves 9 of the third supports 8. Furthermore, the third supports 8 may be removed, and each light receiver 3 is disposed at an orientation and position in which light reflected by a surface of an object (finger) contacting the light guide plate 1 can be received.

Figure 6:
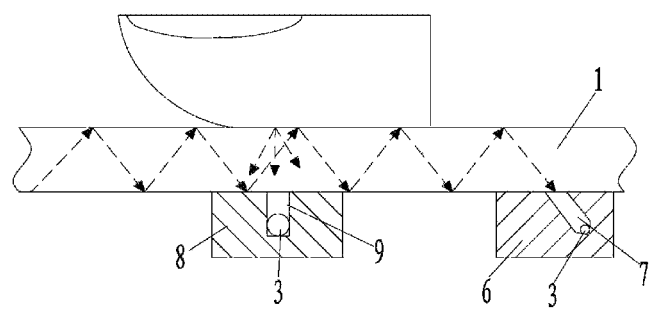
FIG. 6 is a schematic diagram of a contact image acquisition device according to a sixth embodiment of the invention.

For the schematic diagram of the contact image acquisition device according to a sixth embodiment of the invention as shown in FIG. 6, most of the structure thereof is the same as that in the embodiment shown in FIG. 4, except that one part of the plurality of light receivers 3 are respectively disposed in the second light guiding grooves 7 of the plurality of second supports 6 connected to the lower surface of the light guide plate 1, and the other part of the light receivers 3 are respectively disposed in the third light guiding grooves 9 of the plurality of third supports 8 connected to the lower surface of the light guide plate 1. Two different detection measures may be implemented by the plurality of light receivers 3 at the same time. The light propagated through total internal reflection in the light guide plate 1 and the light diffused on the surface of the finger may be detected at the same time, thereby the accuracy of detection may be improved.

This embodiment may vary as follows: one part of light receivers 3 are directly disposed at an orientation and position in which the light entering the light guide plate 1 and propagating through total internal reflection can be received, and the other part of light receivers 3 are directly disposed at an orientation and position in which the light reflected by the surface of the object (finger) contacting the light guide plate 1 can be received.

The implementation mode of the light receivers with different detection measures in the embodiments of the above FIG. 4, FIG. 5 and FIG. 6 may be applied to other embodiments of the invention.

Figure 7:
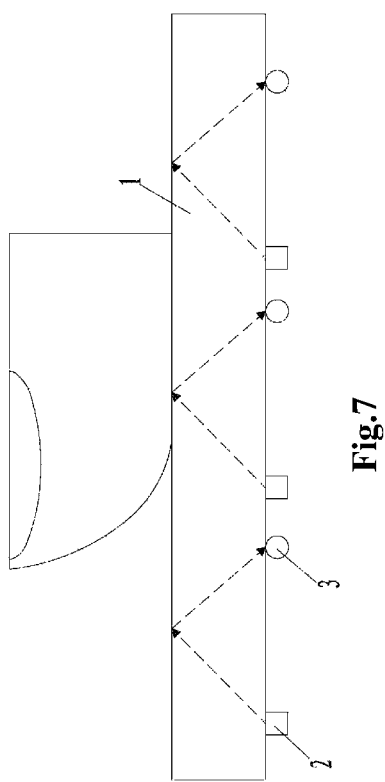
FIG. 7 is a schematic diagram of a contact image acquisition device according to a seventh embodiment of the invention.

For the schematic diagram of the contact image acquisition device according to a seventh embodiment of the invention as shown in FIG. 7, most of the structure thereof is the same as that in the embodiment shown in FIG. 1, except that the plurality of light emitters 2 are also tightly fitted to the lower surface of the light guide plate 1, and each light emitter 2 is placed together with one light receiver 3 in pairs. Such a design may guarantee that enough optical signals can be received and a clear enough fingerprint image can be obtained.

In use, when no finger is touching the light guide plate 1, light in the light guide plate 1 propagates through total internal reflection, and the energy of light received by each light receiver 3 is constant. When a finger is touching the light guide plate 1, because sweat exists on the surface of the finger, the total internal reflection condition of the light is frustrated, so that the incident light is projected onto the finger through the surface of the light guide plate 1. Part of the incident light is absorbed by the finger, or part of the incident light is diffused in various angles. As a result, an output signal of the light receiver 3 corresponding to a location touched by the finger is weakened. By detecting the change of the output signals of the light receivers 3, a fingerprint image may be acquired, or whether the light guide plate 1 is touched by the finger may be detected, or a location touched by a finger may be detected.

Figure 8:
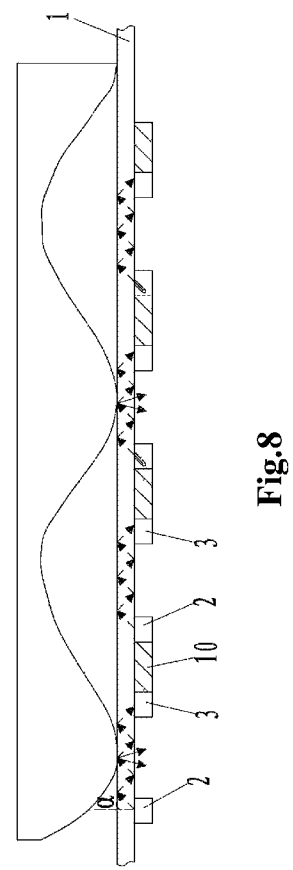
FIG. 8 is a schematic diagram of a contact image acquisition device according to an eighth embodiment of the invention.

For the schematic diagram of a contact image acquisition device according to an eighth embodiment of the invention as shown in FIG. 8, most of the structure thereof is the same as that in the embodiment shown in FIG. 7, except that a light-blocking structure 10 for preventing light from mutual interference is disposed between adjacent pairs of the light emitters 2 and the light receivers 3. The light-blocking structure 10 is a light-blocking coating disposed on the light guide plate 1. The light-blocking coating may be a diffuse reflection coating, a light-absorbing coating or other types of coating, or even a transparent coating, so long as it can destroy the mutual interference of light of respective pairs of light emitter 2 and light receiver 3. The light-blocking coating may be coated on the lower surface or the upper surface of the light guide plate 1. In this embodiment, the light-blocking coating is coated on the lower surface of the light guide plate 1. In this figure, the size (the product of length and width) of each pair of light emitter 2 and light receiver 3 is the size of each rectangular block region formed by separating the light guide plate 1 through the light-blocking structure 10. Here, the light-blocking structure 10 may also be a light-blocking groove on the light guide plate 1 in the embodiment shown in FIG. 9, and the light-blocking structure 10 may also be a convex structure or a concave structure formed on the light guide plate 1 through processing in the embodiment of FIG. 10, or a coating made of a transparent material with a refractive index different from that of the light guide plate 1, which all pertain to the protection scope of the invention.

For the schematic diagram of a contact image acquisition device according to an eleventh embodiment of the invention as shown in FIG. 11, most of the structure thereof is the same as that in the embodiment shown in FIG. 7, except that light emitted by a light emitter 2 in one pair is received by a light receiver 3 in another pair spaced apart from current pair. For example, in this embodiment, light emitted by a light emitter 2 in a first pair of light emitter 2 and light receiver 3 is received by a light receiver 3 in a third pair of light emitter 2 and light receiver 3, light emitted by a light emitter 2 in a second pair of light emitter 2 and light receiver 3 is received by a light receiver 3 in a fourth pair of light emitter 2 and light receiver 3, light emitted by a light emitter 2 in the third pair of light emitter 2 and light receiver 3 is received by a light receiver 3 in a fifth pair of light emitter 2 and light receiver 3, and so on. Such a configuration may solve a problem that the thickness of the light guide plate 1 may limit the minimum distance between the light emitter 2 and the light receiver 3.

In above embodiments of the contact image acquisition device according to the invention, a matrix frustrated total internal reflection (MATRIX FTIR) technology is employed. That is, the light receivers 3 are placed in the form of matrix on the lower surface of the light guide plate 1, while the light emitters 2 may not only be placed on the sides of the light guide plate 1, but also be placed with the light receivers 3 in pairs under the light guide plate 1. Thus, when the light receivers 3 are arranged densely enough, or when both the light receivers 3 and the light emitters 2 are arranged densely enough, a clear enough fingerprint image may be obtained, and a touch locating function may be accomplished at the same time.

Figure 12:
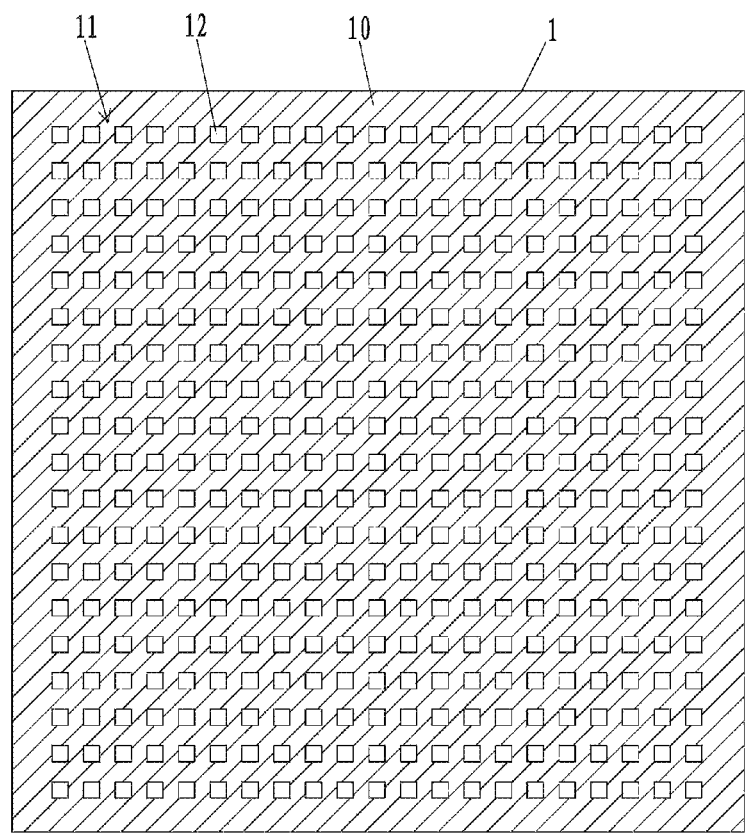
FIG. 12 is a schematic diagram of a touch screen according to a first embodiment of the invention.

In the schematic diagram of a touch screen according to a first embodiment of the invention as shown in FIG. 12, the touch screen includes one or more contact image acquisition devices 11 according to one of FIG. 1-FIG. 11. In this embodiment, the touch screen is constructed by connecting a plurality of contact image acquisition devices 11 of FIG. 8. The plurality of contact image acquisition devices 11 are arranged in a matrix. The light guide plate 1 of the plurality of contact image acquisition devices 11 is formed integrally. For convenient description, each pair of light emitter and light receiver is called a touch sensor 12. The touch sensor 12 is miniaturized enough, so that it can implement a touch sensing function. In this embodiment, the area (the product of length and width) of each touch sensor 12 (i.e., the size (the product of length and width) of each small rectangular block in the figure) is 4 mm$^2$, that is, 2 mm×2 mm. In this way, a high-resolution multipoint touch function may be accomplished.

Figure 13:
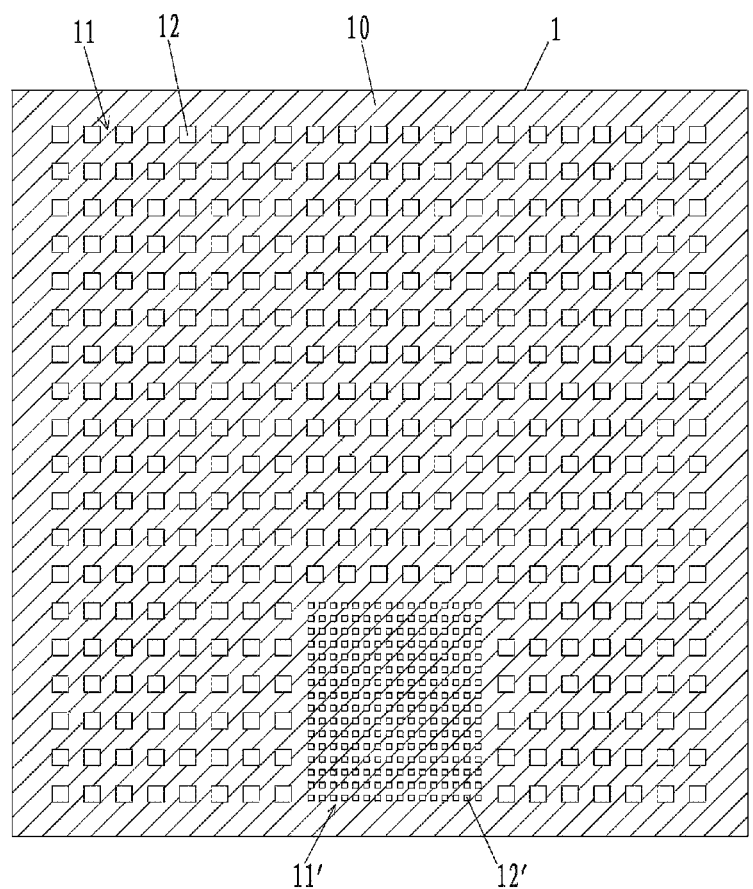
FIG. 13 is a schematic diagram of a touch screen according to a second embodiment of the invention.

For the schematic diagram of a touch screen according to a second embodiment of the invention as shown in FIG. 13, most of the structure thereof is the same as that in the embodiment shown in FIG. 12, except that a plurality of second contact image acquisition devices 11' having a fingerprint acquisition function are disposed in the middle of the lower portion of the touch screen. The plurality of second contact image acquisition devices 11' are also arranged in a matrix. The area (the product of length and width) of each second touch sensor 12' (each pair of light emitter and light receiver) in the second contact image acquisition devices 11' is 1600 μm$^2$, that is, 40 μm×40 μm. A center distance between adjacent two second touch sensors 12' is 50.8 μm. Such a touch screen with a fingerprint acquisition function greatly reduces the cost, that is what the products on the current market can't do.

Figure 14:
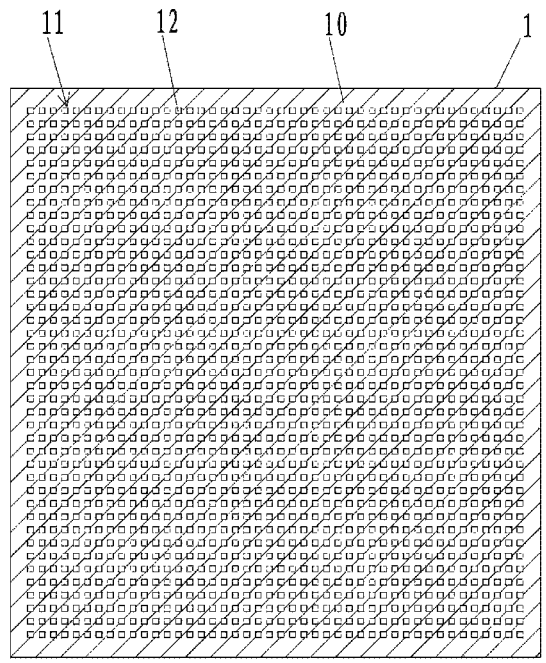
FIG. 14 is a schematic diagram of a fingerprint acquisition device according to an embodiment of the invention.

For the schematic diagram of a fingerprint acquisition device according to an embodiment of the invention as shown in FIG. 14, the structure thereof is basically the same as that of FIG. 12, except that the size (the product of length and width) of each touch sensor 12 in this embodiment is smaller than that of the touch sensor in the embodiment of FIG. 12, and the distribution density of the touch sensors 12 is improved. For example, when the size (the product of length and width) of each touch sensor 12 is no larger than 2580.64 μm$^2$, that is, 50.8 μm×50.8 μm, and the center distance between adjacent two touch sensors 12 is no larger than 50.8 μm, a fingerprint acquisition device with an acquisition resolution of 500 PPI may be made according to the related international standard. Preferably, the size (the product of length and width) of each touch sensor 12 is 1600 μm$^2$, that is, 40 μm×40 μm, and the center distance between adjacent two touch sensors 12 is 50.8 μm.

In addition, if the size (the product of length and width) of the above touch sensors 12 and the center distance between adjacent touch sensors 12 are designed smaller, for example, the size (the product of length and width) of each touch sensor 12 is designed as 400 μm$^2$, that is, 20 μm×20 μm, and the center distance between adjacent two touch sensors 12 is 25.4 μm, so that the resolution of the fingerprint acquisition reaches 1000 PPI. This has a positive effect on the accuracy of fingerprint identification. This may improve the accuracy rate of fingerprint identification.

If the size (the product of length and width) of the above touch sensors 12 and the center distance between adjacent touch sensors 12 can be designed so that a fingerprint acquisition resolution of 500 PPI cannot be obtained, but a fingerprint acquisition resolution approaching 500 PPI, for example, above 300 PPI, can be obtained, they may also be used even if the related international standard cannot be met.

In conjunction with FIG. 8, in use, a finger is placed on the light guide plate 1. Because the surface of the fingerprint has protrusions and ravines, when the finger is touching the light guide plate 1, protrusive lines of the fingerprint will tightly contact with the light guide plate 1, while ravine regions between the lines cannot contact with the light guide plate 1. The part contacting with the light guide plate 1 may frustrate the total internal reflection of the light in a corresponding region in the light guide plate 1, so that an output signal of the contact image acquisition device 11 in this region is weakened greatly. However, the part that cannot contact with the light guide plate 1 may not frustrate the total internal reflection of the light in a corresponding region in the light guide plate 1, and an output signal of the contact image acquisition device 11 in the corresponding region may not be changed. By measuring output signals of all the contact image acquisition devices 11, a fingerprint image with bright and dark stripes may be obtained.

Figure 15:
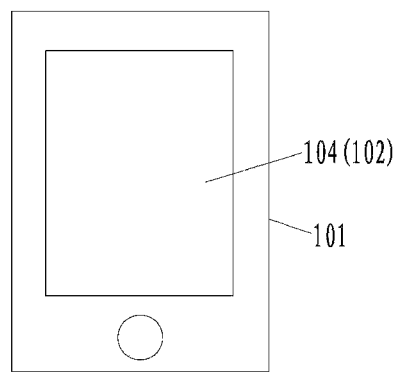
FIG. 15 is a schematic diagram of an electronic device according to a first embodiment of the invention.

The contact image acquisition devices according to embodiments of the above FIG. 1-FIG. 11 may all be installed on an electronic device. For example, the contact image acquisition device may be used on a terminal device such as a mobile phone, and may be located on the HOME key or on the display screen. Referring to the schematic diagram of an electronic device according to a first embodiment of the invention as shown in FIG. 15, the contact image acquisition device is mounted on an electronic device 101. In this embodiment, the electronic device 101 is the mobile phone. In this embodiment, the contact image acquisition device is a structure 102 with a fingerprint acquisition function and is installed under a transparent protection panel 104 of a display screen of the electronic device 101. The transparent protection panel 104 of the display screen is used as a light guide plate. In use, when a user presses a finger on the transparent protection panel 104 of the display screen, the electronic device 101 may acquire a fingerprint image of the user, detect whether a finger touches the transparent protection panel 104 of the display screen, or detect a location touched by the finger on the transparent protection panel 104 of the display screen.

Figure 16:
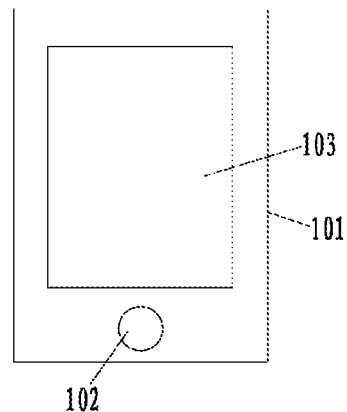
FIG. 16 is a schematic diagram of an electronic device according to a second embodiment of the invention.

Referring to the schematic diagram of an electronic device according to a second embodiment of the invention as shown in FIG. 16, in this embodiment, a plurality of contact image acquisition devices are installed on an electronic device 101. One part of the contact image acquisition devices have the touch screen function, and this part is called a touch screen function structure 103. The other part of contact image acquisition devices have the fingerprint acquisition function, and this part is called a fingerprint acquisition function structure 102. The two parts are both installed on the electronic device 101. In this embodiment, the fingerprint acquisition function structure 102 is located under the touch screen function structure 103.

Figure 17:
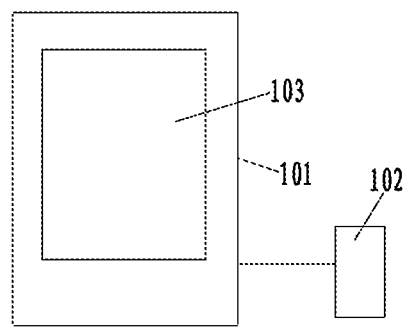
FIG. 17 is a schematic diagram of an electronic device according to a third embodiment of the invention.

FIG. 17 shows a schematic diagram of an electronic device according to a third embodiment of the invention. The difference between this embodiment and FIG. 15 lies in that: the fingerprint acquisition function structure 102 is an independent device, which is connected with the electronic device 101 via a wire and an interface.

The electronic device in the above FIG. 16 or FIG. 17 may be a series of electronic devices in which a touch screen or/and a fingerprint acquisition device is/are required, such as a mobile phone, a tablet, a laptop computer, an electronic access control device, a wearable mobile terminal device, a display device and the like.

The above embodiments are all preferred embodiments. An embodiment falls into the protection scope of the invention, so long as part of light emitted by the light emitters 2 can be emitted into the light guide plate 1 and the energy of light received by the light receivers 3 corresponding to the light emitters 2 changes, even if the incident angle α of the light emitted into the light guide plate 1 is not in the range from $\arcsin(n_0/n_2)$ to $\arcsin(n_1/n_2)$. Therefore, the protection scope of the invention will not be limited by whether the incident angle α is in the range from $\arcsin(n_0/n_2)$ to $\arcsin(n_1/n_2)$.

Other implementations of the invention may be easily envisaged by one skilled in the art after considering the specification and practicing the invention disclosed herein. This application intends to cover any variations, usage or adaptive changes of the invention, which comply with the general principles of the invention and include common knowledge or conventional technical means in the art that are not disclosed. The specification and embodiments are exemplary only, and the true scope and spirit of the invention are defined by the claims.

It should be understood that, the invention is not limited to precise structures described above and shown in the drawings, and various modifications and variations may be made without departing from the scope thereof. Therefore, the scope of the invention is only defined by the claims appended.

What is claimed is:

1. A contact image acquisition device, comprising:
a light guide plate;
a plurality of light emitters configured for emitting at least part of light into the light guide plate, wherein the plurality of light emitters are disposed on at least one side of the light guide plate or under the light guide plate; and
a plurality of light receivers configured for receiving the light emitted into the light guide plate by the light emitters, wherein the plurality of light receivers are arranged in a matrix,
wherein one part of the light receivers are disposed at an orientation and position in which light entering the light guide plate and propagating through total internal reflection can be received, and the other part of the light receivers are disposed at an orientation and position in which light reflected by a surface of an object contacting the light guide plate can be received.

2. The contact image acquisition device according to claim 1, wherein the plurality of light receivers are disposed under the light guide plate.

3. The contact image acquisition device according to claim 1, wherein each of the light receivers is disposed at an orientation and position in which light entering the light guide plate and propagating through total internal reflection can be received or at an orientation and position in which light reflected by a surface of an object contacting the light guide plate can be received.

4. The contact image acquisition device according to claim 1, wherein at least part of light is emitted into the light guide plate with an angle from $\arcsin(n_0/n_2)$ to $\arcsin(n_1/n_2)$, with respect to the normal direction of the light guide plate surface; wherein $n_0$ is a refractive index of an external medium of the light guide plate, $n_1$ is a refractive index of the surface of the object contacting the light guide plate, and $n_2$ is a refractive index of the light guide plate.

5. The contact image acquisition device according to claim 1, wherein the light emitted by the light emitters is visible light or near infrared light/infrared light that is invisible to naked eyes.

6. The contact image acquisition device according to claim 1, wherein each of the light emitters is placed together with one light receiver in pairs.

7. The contact image acquisition device according to claim 6, wherein a light-blocking structure is disposed between adjacent pairs of light emitter and light receiver.

8. The contact image acquisition device according to claim 7, wherein the light-blocking structure is a light-blocking coating or a light-blocking groove disposed on the light guide plate, a concave or convex structure formed on the light guide plate through processing, or a coating made of a transparent material with a refractive index different from a refractive index of the light guide plate.

9. The contact image acquisition device according to claim 6, wherein light emitted by a light emitter in each pair is received by a light receiver in another pair disposed to be spaced apart from the each pair.

10. The contact image acquisition device according to claim 1, wherein the light emitters emit light continuously or in pulse mode, and the light receivers receive the light continuously or in pulse mode.

11. A touch screen, comprising one or more contact image acquisition devices according to claim 1.

12. The touch screen according to claim 11, wherein a plurality of contact image acquisition devices are arranged in a matrix.

13. A fingerprint acquisition device, comprising one or more contact image acquisition devices according to claim 1.

14. The fingerprint acquisition device according to claim 13, wherein a plurality of contact image acquisition devices are arranged in a matrix.

15. The contact image acquisition device according to claim 6, wherein light emitted by a light emitter in each pair is received by a light receiver in the each pair.

* * * * *